United States Patent
Goto et al.

(10) Patent No.: US 11,934,944 B2
(45) Date of Patent: Mar. 19, 2024

(54) NEURAL NETWORKS USING INTRA-LOOP DATA AUGMENTATION DURING NETWORK TRAINING

(71) Applicant: International Business Machines Corporation, Armonk, NY (US)

(72) Inventors: Takuya Goto, Tokyo (JP); Masaharu Sakamoto, Kanagawa (JP); Hiroki Nakano, Shiga (JP)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 16/151,648

(22) Filed: Oct. 4, 2018

(65) Prior Publication Data
US 2020/0110994 A1 Apr. 9, 2020

(51) Int. Cl.
*G06N 3/08* (2023.01)
*G06F 18/214* (2023.01)
(Continued)

(52) U.S. Cl.
CPC ............. *G06N 3/08* (2013.01); *G06F 18/214* (2023.01); *G06N 3/044* (2023.01); *G06V 10/772* (2022.01); *G06V 10/82* (2022.01)

(58) Field of Classification Search
CPC .......... G06N 3/08; G06N 3/044; G06N 20/00; G06N 3/045; G06F 18/214; G06V 10/772; G06V 10/82
See application file for complete search history.

(56) References Cited

U.S. PATENT DOCUMENTS

| 9,959,272 B1 * | 5/2018 | Canek .................... G06F 40/58 |
| 2011/0112996 A1 * | 5/2011 | Tu ........................... G06F 3/038 |
| | | 706/54 |

(Continued)

FOREIGN PATENT DOCUMENTS

| CN | 107301387 A | 10/2017 |
| CN | 108140143 A | 6/2018 |

(Continued)

OTHER PUBLICATIONS

Rezaie, A Novel Approach for Implementation of Adaptive Learning Rate Neural Networks, Proceeding Norchip Conference, 2004. 79-82, 2004 (Year: 2004).*

(Continued)

*Primary Examiner* — Aniss Chad
*Assistant Examiner* — Shien Ming Chou
(74) *Attorney, Agent, or Firm* — Edell, Shapiro & Finnan, LLC

(57) ABSTRACT

Methods and systems are provided for training a neural network with augmented data. A dataset comprising a plurality of classes is obtained for training a neural network. Prior to initiation of training, the dataset may be augmented by performing affine transformations of the data in the dataset, wherein the amount of augmentation is determined by a data augmentation variable. The neural network is trained with the augmented dataset. A training loss and a difference of class accuracy for each class is determined. The data augmentation variable is updated based on the total loss and class accuracy for each class. The dataset is augmented by performing affine transformations of the data in the dataset according to the updated data augmentation variable, and the neural network is trained with the augmented dataset.

14 Claims, 4 Drawing Sheets

(51) Int. Cl.
    *G06N 3/044*   (2023.01)
    *G06V 10/772*  (2022.01)
    *G06V 10/82*   (2022.01)

(56) References Cited

U.S. PATENT DOCUMENTS

| | | |
|---|---|---|
| 2015/0170055 A1 | 6/2015 | Beymer et al. |
| 2016/0307098 A1 | 10/2016 | Goel et al. |
| 2016/0358043 A1 | 12/2016 | Mu et al. |
| 2017/0032285 A1 | 2/2017 | Sharma et al. |
| 2017/0068887 A1 | 3/2017 | Kwon |
| 2017/0200092 A1 | 7/2017 | Kisilev |
| 2018/0211164 A1 | 7/2018 | Bazrafkan et al. |
| 2019/0064752 A1* | 2/2019 | Marwah .................. H04L 63/08 |

FOREIGN PATENT DOCUMENTS

| | | |
|---|---|---|
| CN | 108446667 A | 8/2018 |
| JP | 2004252962 A | 9/2004 |
| JP | 2006085695 A | 3/2006 |
| JP | 2007526016 A | 9/2007 |
| JP | 2007527743 A | 10/2007 |
| JP | 2013114590 A | 6/2013 |
| JP | 2014533415 A | 12/2014 |
| JP | 2015037491 A | 2/2015 |
| JP | 2015507242 A | 3/2015 |
| JP | 2017520854 A | 7/2017 |
| JP | 2017520864 A | 7/2017 |
| JP | 2017162244 A | 9/2017 |
| JP | 2017189394 A | 10/2017 |
| JP | 2017529635 A | 10/2017 |
| JP | 2017535340 A | 11/2017 |
| JP | 2018503885 A | 2/2018 |
| WO | 2016077027 A1 | 5/2016 |
| WO | 2018/148526 A1 | 8/2018 |

OTHER PUBLICATIONS

Chawla., SMOTE: Synthetic Minority Over-sampling Technique, Journal of Artificial Intelligence Research, pp. 321-357 (2002) (Year: 2002).*
Bhuiyan, How do I know when to stop training a neural network, ResearchGate GmbH, 2015 (Year: 2015).*
Akosa, Predictive Accuracy a Misleading Performance Measure for High Imbalanced Data, Oklahoma State University, 2017 (Year: 2017).*
Dong, Imbalanced Deep Learning by Minority Class Incremental Rectification, arXiv, Apr. 2018 (Year: 2018).*
He, Imbalanced Learning, Wiley, 2013 (Year: 2013).*
Japkowicz, Learning from Imbalanced Data Sets: A Comparison of Various Strategies, AAAI Technical Report WS-00-05, 2000, AAAI (www.aaai.org), pp. 10-15.
Sakamoto et al., Multi-Stage Neural Networks with Single-Sided Classifiers for False Positive Reduction and its Evaluation using Lung X-Ray CT Images, Mar. 22, 2017, arXiv:1703.00311v3 [cs.CV], pp. 1-11.
Anonymous, Keras: The Python Deep Learning Library, https://keras.io/, retrieved on Oct. 3, 2018, pp. 1-4.
Notification of the First Office Action with English translation in Chinese Application No. 201910904701.0, dated Apr. 11, 2023, 7 pages.
Notice of Grant with English translation in corresponding Chinese Application No. 201910904701.0, dated Sep. 11, 2023, 7 pages.

* cited by examiner

NEURAL NETWORKS USING INTRA-LOOP DATA AUGMENTATION DURING NETWORK TRAINING

BACKGROUND

1. Technical Field

Present invention embodiments relate to machine learning systems, and in particular, to performing dynamic data augmentation during training to improve performance of neural networks.

2. Discussion of the Related Art

Deep neural networks typically need a large corpus of training data to meet specified performance criteria. However, collection of such training data is often time consuming and may be expensive. Not having enough training data or using a training data set that is biased may lead to a trained neural network that is also biased, and in which classification of the training data is subject to overfitting. Accordingly, the trained neural network may not meet desired performance criteria when applied to other datasets.

SUMMARY

According to embodiments of the present invention, methods, systems, and computer readable media are provided for training a neural network with augmented data. A dataset comprising a plurality of classes is obtained for training a neural network. Prior to initiation of training, the dataset may be augmented by performing affine transformations of the data in the dataset, wherein the amount of augmented data generated is determined by a data augmentation variable. The neural network is trained with the augmented dataset. A total loss (based on the training) and a difference of class accuracy for each class is determined. The data augmentation variable is updated based on the total loss and class accuracy for each loss. The dataset is augmented by performing affine transformations of the data in the dataset according to the updated data augmentation variable, and the neural network is trained with the augmented dataset.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

Present invention embodiments may improve the performance of neural networks trained on a limited or biased amount of data, when operating on generalized data. To achieve this capability, a data augmentation step is incorporated into a training loop when training the neural network. In some aspects, data augmentation is performed both before initiation of training and during the training loop for training the neural network.

Figure 1:
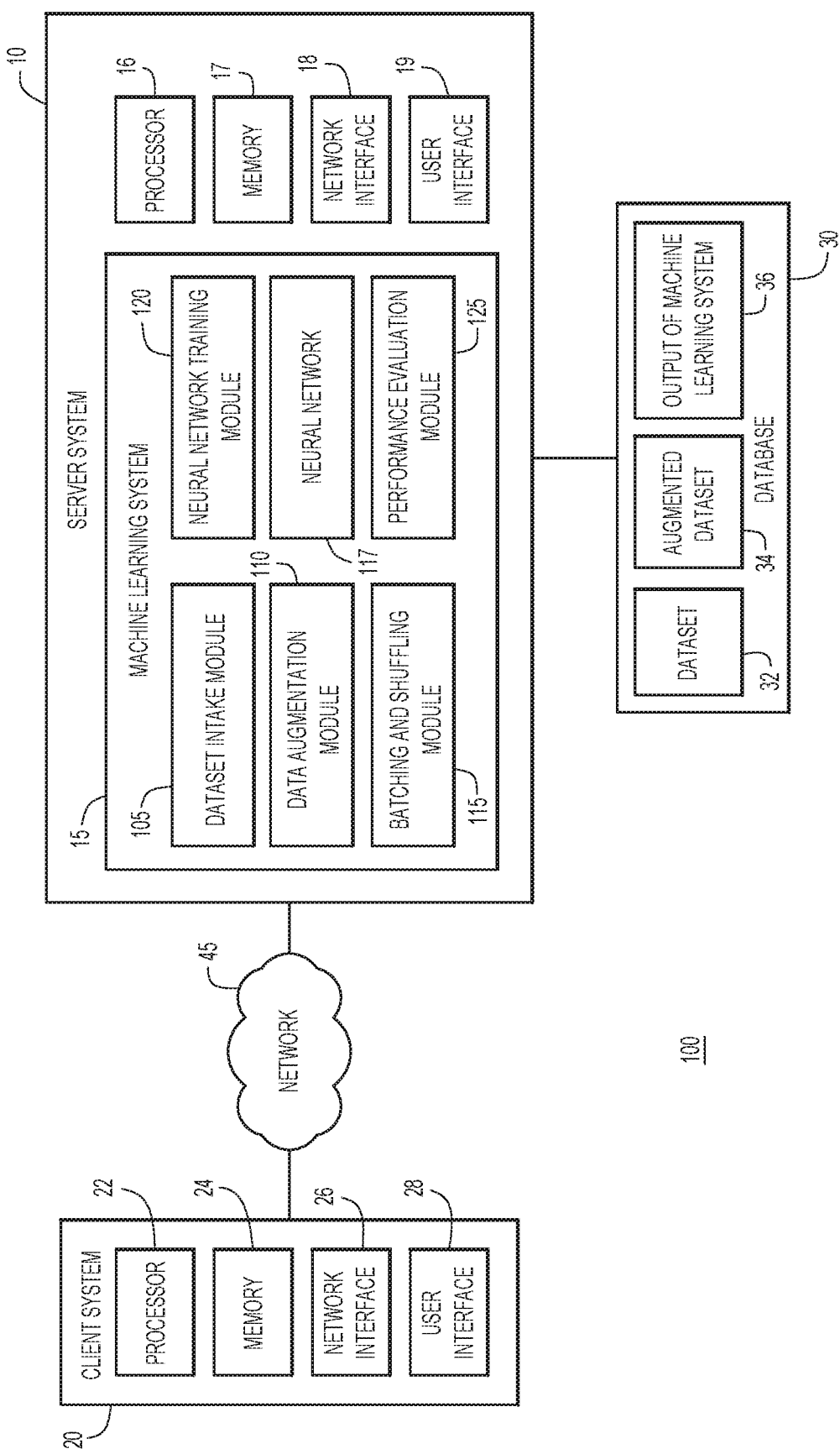
FIG. 1 is a block diagram of an example computing environment for training of a neural network with dynamically augmented datasets in accordance with embodiments of the present disclosure.

An example environment for use with present invention embodiments is illustrated in FIG. 1. Specifically, the environment includes one or more server systems 10, one or more client or end-user systems 20, a database 30, and a network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20 may be local to each other, and may communicate via any appropriate local communication medium, such as local area network (LAN), hardwire, wireless link, Intranet, etc.

Client systems 20 enable users to submit datasets to server systems 10 for training a neural network and for using the trained neural network for analyzing data. The server systems 10 include a machine learning system 15 comprising a data intake module 105, a data augmentation module 110, a batching and shuffling module 115, a neural network 117, a neural network training module 120, and a performance evaluation module 125 as described herein. A database 30 may store various information for the analysis, such as dataset 32, augmented dataset 34, output of machine learning system 36, etc. The database system may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface, such as a GUI, etc., or other interface, such as command line prompts, menu screens, etc., to solicit information from users pertaining to the desired datasets and analysis, and may provide reports including analysis results of the dataset, such as classification of an image into a diseased or non-diseased state, analysis of text or other information, etc.

Server systems 10 and client systems 20 may be implemented by any conventional or other computer systems preferably equipped with a display or monitor, a base, optional input devices, such as, a keyboard, mouse or other input device, and any commercially available and custom software, such as server/communications software, machine learning system software, browser/interface software, etc. By way of example, the base includes at least one processor 16, 22 one or more memories 17, 24 and/or internal or external network interfaces or communications devices 18, 26 such as a modem, network cards, and a user interface 19, 28 etc. The optional input devices may include a keyboard, mouse, or other input device.

Alternatively, one or more client systems 20 may perform augmentation of datasets and training of the neural network as a stand-alone device. In this mode of operation, the client system stores or has access to the data, such as dataset 32, and generates augmented dataset 34, and output of machine learning system 36. The graphical user or other interface 28, such as a GUI, command line prompts, menu screens, etc., solicits information from a corresponding user pertaining to the desired analysis, and may provide reports including analysis results, such as output of machine learning system 36, statistics for determining the performance of the neural network, etc.

Machine learning module 15 may include one or more modules or units to perform the various functions of present invention embodiments described herein. The various modules, such as dataset intake module 105, data augmentation module 110, batching and shuffling module 115, a neural network 117, neural network training module 120, and performance evaluation module 125, etc., may be implemented by any combination of any quantity of software and/or hardware modules or units, and may reside within memory 17 of the server for execution by processor 16.

Dataset intake module 105 may read datasets to be augmented and used for training the neural network. The datasets may comprise one or more classes, and may be in any suitable format including image, csv, text, excel, relational database format, etc. It is understood that datasets that are not in a suitable format may undergo preprocessing to be placed in a format compatible for ingestion by the dataset intake module 105.

Data augmentation module 110 may perform various affine or other operations on the dataset ingested by the dataset intake module 105. According to aspects of the invention, datasets that are ingested by the dataset intake module may be small or biased, and therefore, not generally representative of the data that the trained neural network will operate on. Using a neural network that has been trained on a biased data set may result in a neural network that is not optimized to operate on generalized data. By creating augmented datasets before and during training of the neural network, the performance of the neural network on generalized data may be improved.

The affine operations may include but are not limited to, rotation, translation, resizing, blurring, etc. In an image dataset, the rotation degree and enlargement/reduction factor may be set randomly. Typically, images may be rotated by about 10-20 degrees and/or translated up to about 10%, though other ranges may be used. In some aspects, these parameters may be set or modified by the user.

Data augmentation module 110 may also govern parameters that control the magnitude of augmentation during intra-loop training. These processes are described in additional detail with regard to FIGS. 2 and 3. For example, the magnitude of augmentation parameter ($L_c$) may be updated in accordance with balance of class accuracies as provided herein.

Batching and shuffling module 115 may shuffle the dataset, for example, by rearranging the order of data across one or more datasets. For large files, the data may be divided or batched into smaller files that are provided to the machine learning system. For example, an epoch or entire dataset may be shuffled and divided into a plurality of smaller files, each smaller file containing a portion of the dataset for training of the neural network.

Neural network training module 120 trains a neural network 117 using the augmented dataset. The neural network 117 may comprise any number of suitable input nodes in an input layer, any number of hidden or intermediate nodes in a hidden layer, and one or more output nodes of an output layer. The neural network 117 may perform any suitable function including pattern recognition, classification, identification of associations between variables, etc. Neural networks may include but are not limited to feedforward or feedback neural networks, radial basis function neural networks, self-organizing neural networks, recurrent neural networks (RNNs), convolutional neural networks.

Performance evaluation module 125 may evaluate the performance of the trained neural network, e.g., using receiver operator curve or other suitable characteristic. The neural network may undergo additional training if a suitable performance characteristic has not been met.

Figure 2:
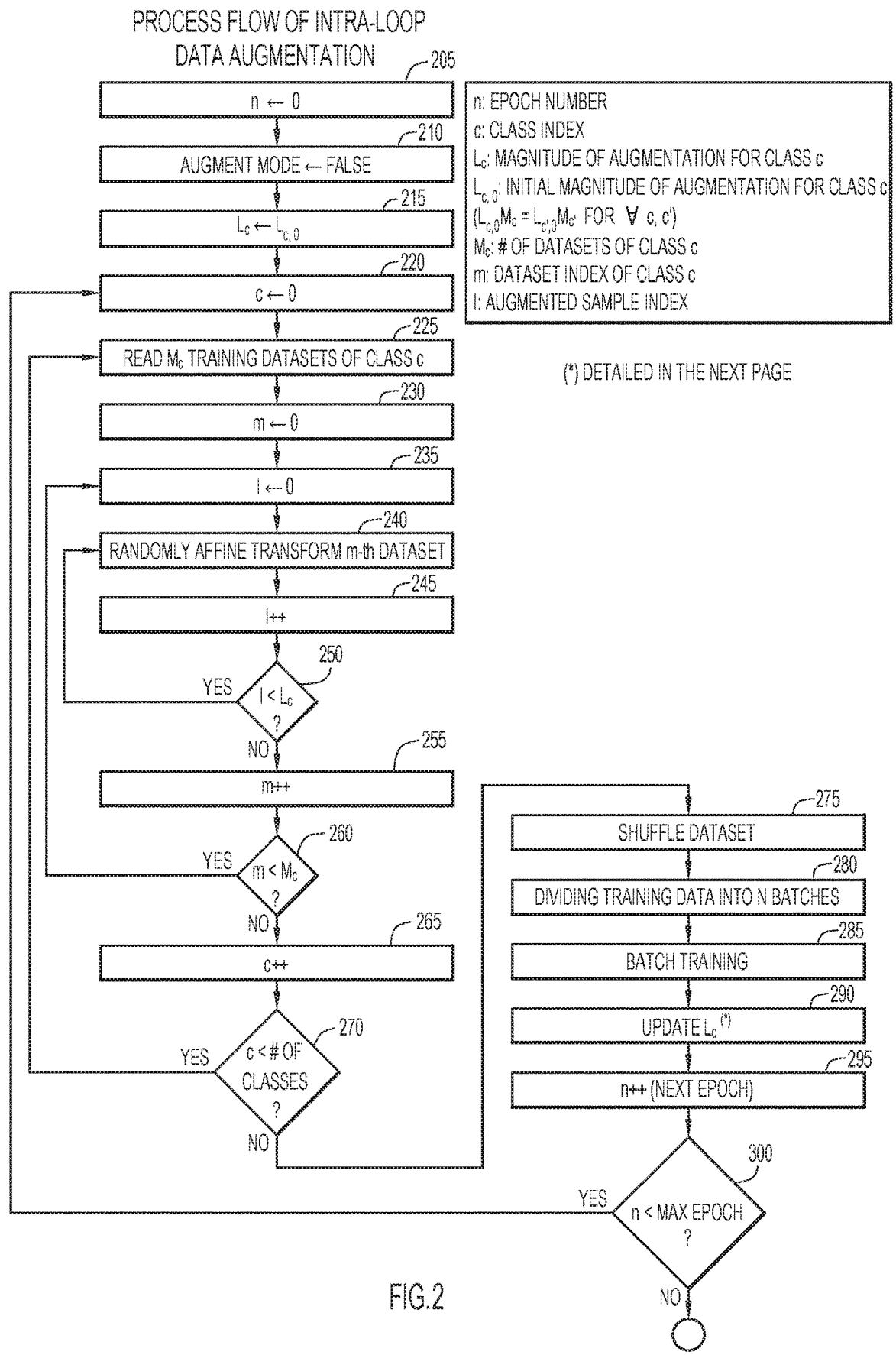
FIG. 2 is a flowchart of example operations for training a neural network with dynamically augmented datasets, according to embodiments of the present disclosure.

A flowchart of example operations is provided in FIG. 2. The augmented dataset produces an improvement in the performance of the neural network, due to training with a larger, more generalized dataset. An augmented dataset may be generated prior to the initial training loop for a neural network and during each pass through the training loop. Thus, data augmentation and data shuffling may be performed not only before the training loop, but also during the training loop.

At operation 205, the epoch number (n) is set to zero. Unless otherwise indicated, an epoch may refer to a number of times that the same training dataset is used to train the neural network. At operation 210, the augment mode is set to false so that the magnitude of augmentation parameter ($L_c$) is not updated during the initial stage of learning. At operation 215, the magnitude of augmentation parameter ($L_c$) is set to a value indicating an initial magnitude of augmentation ($L_{c,0}$) for class (c).

At operation 220, class (c) is initialized to a value of zero. In some aspects, a class may refer to a category having a particular attribute, wherein the attribute may be used for classification. At operation 225, the system may read in a number ($M_c$) of training datasets of class c. At operations 230 and 235, variables representing a dataset index of class c (m) and an augmented sample index (1) are both set to zero.

At operations 240-250, the system enters a loop in which affine or other transformations are performed on the dataset. At operation 240, the system may randomly transform the $m^{th}$ dataset in an affine manner such that features of the dataset are maintained. For example, affine transformation may preserve certain features such as points, straight lines, and planes, as well as sets of parallel lines and ratios of distances between points on a straight line. However, other features such as angles between lines or distances between points may not be preserved. Examples of affine transformations may include but are not limited to translation, scaling, reflection, rotation, shear mapping, enlargement, reduction, similarity transformation, or any combination thereof. At operation 245, the augmented sample index (1) is incremented. At operation 250, if the augmented sample index (1) is less than the magnitude of augmentation for class c ($L_c$), operations 240 and 245 are repeated. When the augmented sample index (1) is greater than or equal to the magnitude of augmentation for class c ($L_c$), the system progresses to operation 255, wherein the dataset index of class c (m) is incremented. At operation 260, when the dataset index of class c (m) is less than the number of datasets in class c ($M_c$), the system returns to operation 235, repeating these operations on a different dataset. When the dataset index of class c (m) is greater than or equal to the number of datasets in class c ($M_c$), the system proceeds to operation 265 to increment the class index (c). At operation 270, the system determines whether the current class index (c) is less than the total number of classes. If not, the system returns to operation 225 to transform different classes. Thus, operations 220-270 may loop through a datasets of a class to augment training datasets. These operations may be repeated for each class.

Once all classes have been transformed, the system progresses to operation 275, wherein the dataset may be shuffled. Shuffling may be performed as part of data augmentation. For each epoch, a set of N batches of training data may be generated from original and/or transformed images. Shuffling allows each batch of the set of N batches to be different, for each epoch. At operation 280, the training data is divided into N batches. In some cases, a value of N may be determined by the user. At operation 285, the batches are used to train the system. At operation 290, the magnitude for augmentation parameter ($L_c$) is updated, as described further with reference to FIG. 3. At operation 295, the epoch number (n) is incremented. At operation 300, if the epoch number is less than the maximum epoch number, the system returns to operation 220, to repeat operations for the training data set. Otherwise, the training cycle may exit.

The initial magnitude of augmentation ($L_{c,0}$) may be set to balance the number of training samples for each class (see, Examples). If the class accuracy is greater than a threshold of difference of class accuracy ($d_{acc}^{th}$) for a particular class as compared to another class after an epoch training, the magnitude of augmentation may be updated so that the number of training samples for the more accurate class is reduced and/or the number of training samples in the less accurate class is increased in the next training loop. After the class accuracies become balanced, updating of the magnitude of augmentation ceases and the trained neural network is preserved. When a difference between class accuracies becomes lower than the threshold of difference of class accuracy (see, FIG. 3), the class accuracies are regarded as balanced.

Figure 3:
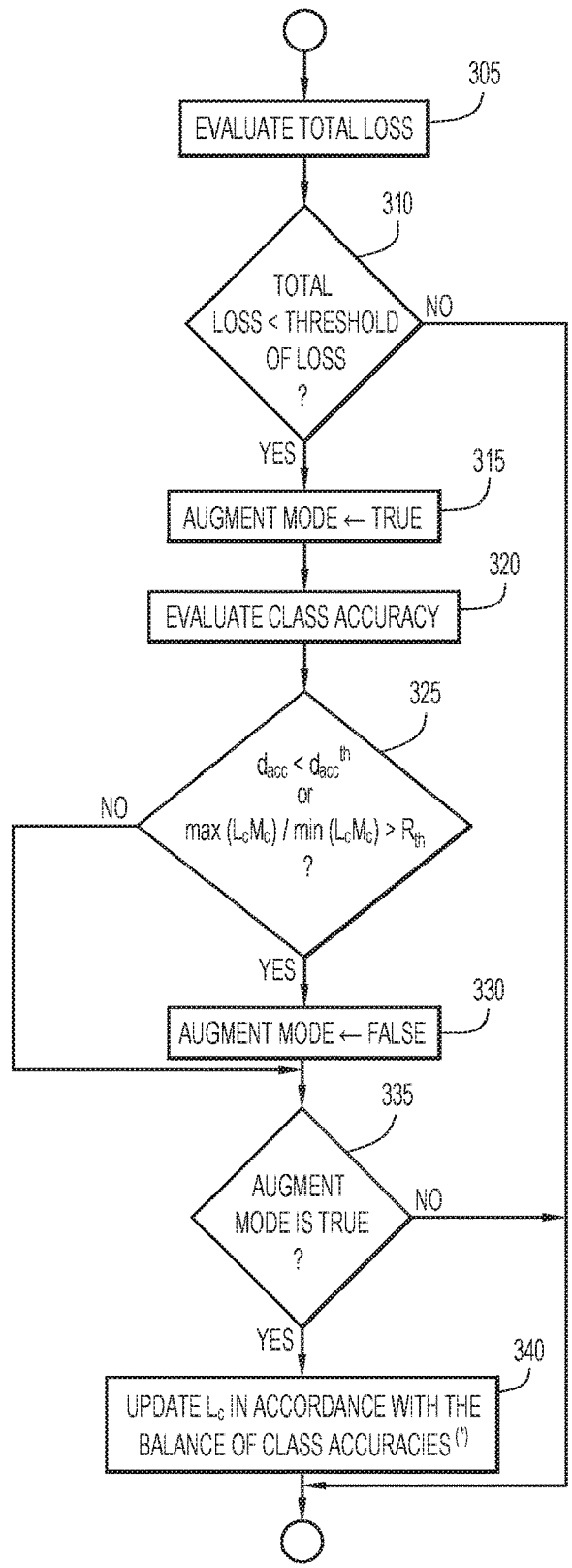
FIG. 3 is a more detailed flowchart of aspects of FIG. 2, and in particular, of updating a magnitude of an augmentation variable, according to embodiments of the present disclosure.

FIG. 3 shows example operations for updating the magnitude of augmentation. In some aspects, the magnitude of augmentation may determine the size of the augmented data for a class.

At operation 305, the total loss based on training results may be determined. At operation 310, the system determines whether the total loss is less than a threshold of loss. If the total loss is less than the threshold of loss, the system proceeds to operation 315, wherein a flag for enabling the augment mode is set to true, allowing the magnitude of augmentation parameter to be updated. If the total loss is not less than the threshold of loss, the system skips operations 315-340, and returns to operation 295. The total loss may be computed based on a loss function configured by the user. For example, if the user decides to use a cross entropy loss function, the cross entropy loss function may be computed as a sum of cross entropy loss for the entire training data dataset.

At operation 320, class accuracy is evaluated for each class. A class accuracy refers to a ratio of accurate predictions of all samples for a particular class. At operation 325, if the difference of class accuracy ($d_{acc}$) is less than the threshold of difference of class accuracy ($d_{acc}^{th}$), the system proceeds to operation 330. (Alternatively, it may be determined whether max ($L_c M_c$)/min ($L_c M_c$)>=$R_{th}$, wherein $R_{th}$ refers to a threshold of ratio between the number of augmented samples.) If the class accuracy is greater than a threshold of difference of class accuracy ($d_{acc}^{th}$) for a particular class as compared to another class after an epoch training, the magnitude of augmentation may be updated so that the number of training samples for the more accurate class is reduced and/or the number of training samples in the less accurate class is increased in the next training loop at operations 335, 340. For example, if the accuracy of class A is 0.95 while the accuracy of class B is 0.1, the magnitude of augmentation for class B ($L_B$) may be updated (e.g., $L_B = L_B + 1$) so that the number of training samples of class B, $L_B M_B$ is increased in the next training loop as compared to class A, $L_A M_A$. If there are three or more classes (e.g., A, B, C), the difference may be computed for all sets of classes (e.g., between A and B, A and C, B and C), and each of these differences are required to be below a threshold. For example, if the accuracy of class A is 0.95, the accuracy of class of class B is 0.1 and the accuracy of class C is 0.9, the magnitude of augmentation for class B will be updated only once although the difference between A and B, and between B and C is above a threshold. In other cases, if the accuracy of class A is 0.95, the accuracy of class of class B is 0.1 and the accuracy of class C is 0.1, the magnitudes of augmentation for class B and C will be updated. Thus, the updates may be performed individually.

If $d_{acc}$ is less than the threshold of difference of class accuracy ($d_{acc}^{th}$), then the system proceeds to operation 330, wherein the augment mode is set to false. If $d_{acc}$ is not less than the difference of class accuracy, then the operation skips operation 330. At operation 335, if the augment mode is determined to be true, then the system proceeds to operation 340, wherein the magnification of augmentation ($L_c$) is updated in accordance with the balance of class accuracies. Otherwise, if the augment mode is determined to be false, then the system skips operation 340 and proceeds to operation 295.

Update of the magnitude of augmentation ends when the difference of class accuracy is lower than a threshold of difference of class accuracy or when the ratio of (classes with the largest number of samples after augmentation)/(classes with the smallest number of samples after augmentation) is equal to or larger than a threshold of ratio between the number of augmented samples. The augment mode flag is set to false when this condition is met.

In general and with regard to FIG. 3, the magnitudes of augmentation may be different for each class. The magnitudes may be updated adaptively in accordance with the balance of class accuracies at the end of training with each epoch when the total loss is below the threshold of loss. The magnitude of augmentation may continue to update until the differences between class accuracies becomes lower than the threshold of differences of the class accuracy.

Figure 4:
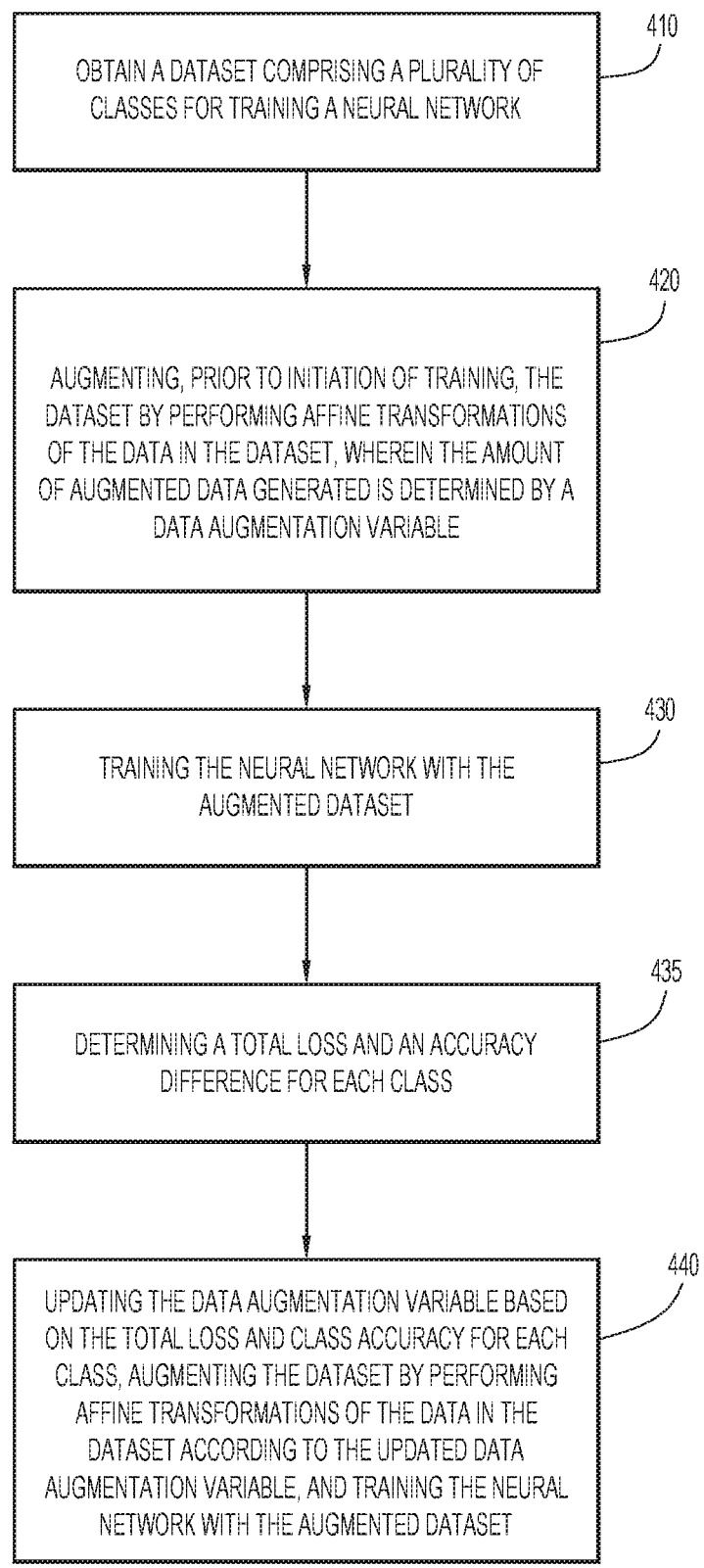
FIG. 4 is a flowchart of example operations for generating augmented datasets during training of a neural network, according to embodiments of the present disclosure.

FIG. 4 shows example high level operations of training a neural network with the intra-loop data augmentation system for dynamically generating augmented data. At operation 410, a dataset comprising a plurality of classes is obtained for training a neural network. At operation 420, prior to initiation of training, the dataset may be augmented by performing affine transformations of the data in the dataset, wherein the amount of augmented data generated is determined by a data augmentation variable. At operation 430, the neural network is trained with the augmented dataset. A total loss and an accuracy difference for each class is determined at operation 435. At operation 440, the data augmentation variable is updated based on the total loss and class accuracy for each class, the dataset is augmented by performing affine transformations of the data in the dataset according to the updated data augmentation variable, and the neural network is trained with the augmented dataset.

The present techniques offer multiple advantages over other conventional techniques. For example, by creating augmented datasets before and during training of the neural network, the performance of the neural network on generalized data may be improved. Existing techniques augment the training data prior to training of the neural network. In contrast, the present techniques augment both before and during (intra-loop) training of the neural network. While the convergence speed may be slower using present techniques, the present techniques offer the added benefit of suppressing overfitting as well as improving performance on generalized data.

It will be appreciated that the embodiments described above and illustrated in the drawings represent only a few of the many ways of implementing embodiments for improving the performance of machine learning systems with limited training data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., machine learning system 15, including dataset intake module 105, data augmentation module 110, batching and shuffling module 115, a neural network 117, neural network training module 120, performance evaluation module 125, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., machine learning system 15, including dataset intake module 105, data augmentation module 110, batching and shuffling module 115, a neural network 117, neural network training module 120, performance evaluation module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., machine learning system 15, including dataset intake module 105, data augmentation module 110, batching and shuffling module 115, a neural network 117, neural network training module 120, performance evaluation module 125, etc.). The database system may be implemented by any number of any conventional or other databases, data stores or storage structures (e.g., files, databases, data structures, data or other repositories, etc.) to store information (e.g., datasets 32, augmented dataset 34, output of machine learning system 36, etc.). The database system may be included within or coupled to the server and/or client systems. The database systems and/or storage structures may be remote from or local to the computer or other processing systems, and may store any desired data (e.g., datasets 32, augmented dataset 34, output of machine learning system 36, etc.).

The present invention embodiments may employ any number of any type of user interface (e.g., Graphical User Interface (GUI), command-line, prompt, etc.) for obtaining or providing information (e.g., datasets 32, augmented dataset 34, output of machine learning system 36, etc.), where the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the machine learning system 15 may include any information arranged in any fashion, and may be configurable based on rules or other criteria to provide desired information to a user (e.g., classification results, image analysis results, text analytics, etc.).

The present invention embodiments are not limited to the specific tasks or algorithms described above, but may be utilized for any application in which affine or other transformation of a dataset for training a machine learning module is useful. For example, while the present examples are in the context of neural networks, these techniques may be used for a variety of different types of machine learning systems that are trained using training data. Training data may include images, text, voice, and video, which is time-series image data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLES

Although the following examples are presented within the context of pneumonia, it may be applied to any disorder or disease in which radiological or other images may be used to diagnose a patient with a condition. These examples reference the flowcharts in FIGS. 2 and 3.

Example 1. Machine Intelligence Models to Distinguish Between Images Showing Normal (Absence of Pneumonia) and Abnormal (Presence of Pneumonia) Features In this example, machine intelligence models were trained to distinguish between normal and abnormal features to identify patients with pneumonia. In cases involving the imaging and diagnosis of diseases, more images of normal patients than of diseased patients were available from a dataset. Therefore, the techniques presented herein were used to augment the disease data set in order to improve the accuracy and precision of the neural network.

In the present case, 1000 normal images and 100 diseased images showing pneumonia were obtained. The augmentation magnification values for each class ($L_c$) were set to initial values of 1 for normal images and 10 for images of pneumonia. In general, initial values were set so that the number of samples of each class, in this case a normal class and a disease class, were the same after augmentation. Since the number of original normal images was 1000 and the number of original pneumonia images was 100, the initial value of magnitude for pneumonia was set to 10 so that the number of samples of pneumonia would be 1000.

The data augmentation loop proceeded according to the augmentation process of FIG. 2 until reaching a stop condition for augmentation magnification. For example, after proceeding through operations 220 through 285, the system progressed to operation 290, as shown in FIG. 3. Based on operations 305 and 310, the total loss was computed and compared to a threshold of loss. The accuracy for the class was determined to be lower than a threshold of loss (0.8 for pneumonia). The magnitude of augmentation for pneumonia was updated to 11 (<−10+1).

In general, when the total loss becomes lower than the threshold of loss, and the difference between class accuracies are higher than a threshold of difference of class accuracy, the magnitude of the class with lower class accuracies will be updated, e.g., by incrementing by a value of one, at operation 340. The update of magnitudes of augmentation stops if either one of the stop conditions is met. If the augmentation magnification for pneumonia reaches the upper limit (e.g., when the number of samples reaches 20, which is twice as large as that for the normal images), or when the accuracy difference of class accuracy becomes lower than a threshold of difference of class accuracy, the augmentation process terminates.

Example 2. Determination of Harmonic Mean of the Accuracy for Each Class

In this example, 1000 normal images and 100 pneumonia were provided. Similar to example 1, the augmentation magnification initial values were set to 1 for normal and 10 for pneumonia. The total loss was determined to be lower than a threshold of loss, and the accuracy for each class was lower by 0.8 for pneumonia. Accordingly, the augmentation magnification for pneumonia was updated to 11 (<−10+1), and the update and training were performed until the augmentation magnification for pneumonia reached 20.

Additionally, the harmonic mean of the accuracy for each class was determined for the augmentation magnification of 10 to 20, and training in the remaining epoch was performed at the magnification with the maximum harmonic mean. The harmonic mean may be represented as:

Harmonic Mean $$\frac{N}{\sum_{c=1}^{N} acc_c^{-1}} \qquad (1)$$

($acc_c$: Class $c$ accuracy)

When at least one of variable (e.g., $acc_c$) has a value close to zero, the harmonic mean has a value close to zero irrespective of the value of any other element. When the augmentation magnification is selected for the maximum harmonic mean, the augmentation magnification whose accuracy is high can be selected in any class.

Example 3. Augmentation Trials

A dataset was obtained having 800 original training samples for pneumonia, and 7640 for cell invasion. A test dataset was also obtained having 200 test samples for pneumonia, and 200 for cell invasion.

During trial 1 of data augmentation, the augmentation magnification was set to a value of 10 for pneumonia (8000), and a value of 1 for cell invasion (7640). After 20 epochs, a loss was determined: 0.64->Accuracy: 0.1 for pneumonia, 0.95 for invasion (having a harmonic mean: 0.18).

During trial 2 of data augmentation, the augment magnification was set to a value of 20 for pneumonia (16000), and a value of 1 for invasion (7640). After 20 epochs, a loss was determined: 0.58->Accuracy: 0.82 for pneumonia, 0.35 for invasion (Harmonic mean: 0.49)

After 100 epochs, the accuracy was 0.76 for pneumonia, and 0.84 for invasion (Harmonic mean: 0.80).

What is claimed is:

1. A method for training a neural network with augmented data comprising:
   obtaining a dataset for a plurality of classes for training the neural network;
   augmenting, prior to initiation of training, the dataset by performing affine transformations of data in the dataset, wherein an amount of augmented data generated is determined by a data augmentation variable;
   training the neural network for the plurality of classes with the augmented dataset produced according to the data augmentation variable;
   determining an accuracy for each class based on results of training the neural network, wherein the accuracy for a corresponding class is determined as a ratio of correct predictions for the corresponding class over data from the augmented dataset for the corresponding class;
   determining a total loss and a difference of class accuracy for each class based on results of training the neural network, wherein the difference of class accuracy is a difference between the determined accuracy of different classes;
   updating the data augmentation variable based on the total loss and class accuracy for each class;
   augmenting the dataset by performing affine transformations of the data in the dataset according to the updated data augmentation variable, wherein augmenting the dataset according to the updated data augmentation variable includes:
      comparing the difference of class accuracy for a first class with greater accuracy and a second class with less accuracy to a threshold; and
      reducing a number of training samples for the neural network for the first class with greater accuracy and increasing the number of training samples for the neural network for the second class with less accuracy in response to the difference of class accuracy for the first and second classes being greater than the threshold; and
   training the neural network with the augmented dataset produced according to the updated data augmentation variable, wherein operations of updating, augmenting according to the updated data augmentation variable, and training with the augmented dataset produced according to the updated data augmentation variable are performed until a ratio of a first number of augmented samples over a second number of augmented samples is equal to or larger than a ratio threshold, and wherein the first number of augmented samples includes a number of augmented samples of a class with a maximum number of augmented samples among the plurality of classes and the second number of augmented samples includes a number of augmented samples of a class with a minimum number of augmented samples among the plurality of classes.

2. The method of claim 1, wherein when the total loss is smaller than a predetermined threshold of loss and the difference of class accuracy is larger than a predetermined threshold of difference of class accuracy, iteratively performing updating, augmenting according to the updated data augmentation variable and training with the augmented dataset produced according to the updated data augmentation variable.

3. The method of claim 1, wherein the neural network exhibits a performance improvement as compared to a same neural network trained only with augmentation data prior to initiation of training.

4. The method of claim 1, wherein the affine transformations include rotating, blurring or translating the data.

5. The method of claim 1, wherein a magnitude of the data augmentation variable is initialized based on a size of a class.

6. The method of claim 1, wherein an epoch value determining a number of times that the augmented dataset trains the neural network is greater than one.

7. A system for training a neural network with augmented data comprising at least one processor configured to:
   obtain a dataset for a plurality of classes for training the neural network;
   augment, prior to initiation of training, the dataset by performing affine transformations of data in the dataset, wherein an amount of augmented data generated is determined by a data augmentation variable;
   train the neural network for the plurality of classes with the augmented dataset produced according to the data augmentation variable;
   determine an accuracy for each class based on results of training the neural network, wherein the accuracy for a corresponding class is determined as a ratio of correct predictions for the corresponding class over data from the augmented dataset for the corresponding class;
   determine a total loss and a difference of class accuracy for each class based on results of training the neural network, wherein the difference of class accuracy is a difference between the determined accuracy of different classes;
   update the data augmentation variable based on the total loss and class accuracy for each class;
   augment the dataset by performing affine transformations of the data in the dataset according to the updated data augmentation variable, wherein augmenting the dataset according to the updated data augmentation variable includes:
      comparing the difference of class accuracy for a first class with greater accuracy and a second class with less accuracy to a threshold; and
      reducing a number of training samples for the neural network for the first class with greater accuracy and increasing the number of training samples for the neural network for the second class with less accuracy in response to the difference of class accuracy for the first and second classes being greater than the threshold; and
   train the neural network with the augmented dataset produced according to the updated data augmentation variable, wherein operations of updating, augmenting according to the updated data augmentation variable, and training with the augmented dataset produced according to the updated data augmentation variable are performed until a ratio of a first number of augmented samples over a second number of augmented samples is equal to or larger than a ratio threshold, and wherein the first number of augmented samples includes a number of augmented samples of a class with a maximum number of augmented samples among the plurality of classes and the second number of augmented samples includes a number of augmented samples of a class with a minimum number of augmented samples among the plurality of classes.

8. The system of claim 7, wherein when the total loss is smaller than a predetermined threshold of loss and the difference of class accuracy is larger than a predetermined threshold of difference of class accuracy, the at least one processor is further configured to iteratively perform updating, augmenting according to the updated data augmentation variable and training with the augmented dataset produced according to the updated data augmentation variable.

9. The system of claim 7, wherein the neural network exhibits a performance improvement as compared to a same neural network trained only with augmentation data prior to initiation of training.

10. The system of claim 7, wherein the affine transformations include rotating, blurring, or translating the data.

11. The system of claim 7, wherein a magnitude of the data augmentation variable is initialized based on a size of a class.

12. A computer program product for training a neural network with augmented data, the computer program product comprising one or more computer readable storage media collectively having program instructions embodied therewith, the program instructions executable by a processor to:
 obtain a dataset for a plurality of classes for training the neural network;
 augment, prior to initiation of training, the dataset by performing affine transformations of data in the dataset, wherein an amount of augmented data generated is determined by a data augmentation variable;
 train the neural network for the plurality of classes with the augmented dataset produced according to the data augmentation variable;
 determine an accuracy for each class based on results of training the neural network, wherein the accuracy for a corresponding class is determined as a ratio of correct predictions for the corresponding class over data from the augmented dataset for the corresponding class;
 determine a total loss and a difference of class accuracy for each class based on results of training the neural network, wherein the difference of class accuracy is a difference between the determined accuracy of different classes;
 update the data augmentation variable based on the total loss and class accuracy for each class;
 augment the dataset by performing affine transformations of the data in the dataset according to the updated data augmentation variable, wherein augmenting the dataset according to the updated data augmentation variable includes:
  comparing the difference of class accuracy for a first class with greater accuracy and a second class with less accuracy to a threshold; and
  reducing a number of training samples for the neural network for the first class with greater accuracy and increasing the number of training samples for the neural network for the second class with less accuracy in response to the difference of class accuracy for the first and second classes being greater than the threshold; and
 train the neural network with the augmented dataset produced according to the updated data augmentation variable, wherein operations of updating, augmenting according to the updated data augmentation variable, and training with the augmented dataset produced according to the updated data augmentation variable are performed until a ratio of a first number of augmented samples over a second number of augmented samples is equal to or larger than a ratio threshold, and wherein the first number of augmented samples includes a number of augmented samples of a class with a maximum number of augmented samples among the plurality of classes and the second number of augmented samples includes a number of augmented samples of a class with a minimum number of augmented samples among the plurality of classes.

13. The computer program product of claim 12, wherein when the total loss is smaller than a predetermined threshold of loss and the difference of class accuracy is larger than a predetermined threshold of difference of class accuracy, the program instructions are executable to iteratively perform updating, augmenting according to the updated data augmentation variable and training with the augmented dataset produced according to the updated data augmentation variable.

14. The computer program product of claim 12, wherein a magnitude of the data augmentation variable is initialized based on a size of a class.

* * * * *